United States Patent [19]

Hazen et al.

[11] Patent Number: 4,965,522
[45] Date of Patent: Oct. 23, 1990

[54] MULTIFREQUENCY SIGNAL TRANSMITTER WITH ATTENUATION OF SELECTED HARMONIES FOR AN ARRAY INDUCTION WELL LOGGING APPARATUS

[75] Inventors: Gary A. Hazen; Don T. Macune, both of Houston, Tex.

[73] Assignee: Schlumberger Technology Corporation, Houston, Tex.

[21] Appl. No.: 269,262

[22] Filed: Nov. 9, 1988

[51] Int. Cl.$^5$ .............................................. G01V 3/28
[52] U.S. Cl. ................................. 324/339; 324/335
[58] Field of Search ............... 324/329, 330, 334, 335, 324/338, 339

[56] References Cited

U.S. PATENT DOCUMENTS

| | | |
|---|---|---|
| 2,264,318 | 12/1941 | Lee . |
| 2,582,314 | 1/1952 | Doll . |
| 2,582,315 | 1/1952 | Doll . |
| 2,608,602 | 8/1952 | Muffly .................... 324/329 |
| 2,625,583 | 1/1953 | Broding ................... 324/333 |
| 2,723,375 | 11/1955 | Schuster . |
| 2,725,523 | 11/1985 | Doll . |
| 2,761,103 | 8/1956 | Doll . |
| 2,790,138 | 4/1957 | Poupon . |
| 2,928,038 | 3/1960 | Huddleston, Jr. ........... 324/339 |
| 2,929,984 | 3/1960 | Puranen et al. ........... 324/330 X |
| 2,948,846 | 8/1960 | Coufleau . |
| 2,964,698 | 12/1960 | Lehmberg, Jr. . |
| 2,987,668 | 6/1961 | Goudouin . |
| 3,012,190 | 12/1961 | Doll ..................... 324/335 X |
| 3,051,892 | 8/1962 | Huston ................... 324/339 |
| 3,067,382 | 12/1962 | Schuster . |
| 3,067,383 | 12/1962 | Tanguy . |
| 3,086,168 | 4/1963 | Buckner, Jr. ............. 324/339 |
| 3,090,910 | 5/1963 | Moran . |
| 3,119,061 | 1/1964 | Tanguy . |
| 3,147,429 | 9/1964 | Moran . |
| 3,150,314 | 9/1964 | Tanguy . |
| 3,166,709 | 1/1965 | Doll . |
| 3,179,879 | 4/1965 | Tanguy . |
| 3,226,633 | 12/1965 | Schneider . |
| 3,230,445 | 1/1966 | Sloughter . |
| 3,249.858 | 5/1966 | Gouilloud . |
| 3,259,837 | 7/1966 | Oshry ................... 324/339 |
| 3,327,203 | 6/1967 | Attali . |
| 3,329,889 | 7/1967 | Tanguy . |
| 3,405,349 | 10/1968 | Moran . |
| 3,414,805 | 12/1968 | Attali . |
| 3,457,496 | 7/1969 | Schuster . |
| 3,457,497 | 7/1969 | Schuster . |
| 3,457,498 | 7/1969 | Schuster . |
| 3,457,499 | 7/1969 | Tanguy . |
| 3,457,500 | 7/1969 | Schuster . |
| 3,496,455 | 2/1970 | Gouilloud . |
| 3,706,025 | 12/1972 | Regat . |
| 4,047,098 | 9/1977 | Duroux ................. 324/335 |
| 4,157,579 | 6/1979 | Paul ................... 324/330 X |
| 4,451,789 | 5/1984 | Meador ................. 324/335 X |
| 4,467,425 | 8/1984 | Schaefer . |
| 4,471,436 | 9/1984 | Schaefer . |
| 4,513,376 | 4/1985 | Barber . |
| 4,544,892 | 10/1985 | Kaufman et al. ......... 324/334 |
| 4,572,684 | 9/1984 | Schuster . |
| 4,629,990 | 12/1986 | Zandee ................. 304/335 X |

FOREIGN PATENT DOCUMENTS

| | | |
|---|---|---|
| 136831 | 3/1960 | U.S.S.R. ............... 324/335 |
| 737904 | 5/1980 | U.S.S.R. ............... 324/335 |
| 1016498 | 1/1966 | United Kingdom . |
| 2121189A | 12/1983 | United Kingdom . |
| 2135461 | 8/1984 | United Kingdom . |

OTHER PUBLICATIONS

European Patent Application, Publication No. 0 084 001, Date of Publicaiton of Application, Jul. 20, 1983.

Primary Examiner—Gerard R. Strecker
Attorney, Agent, or Firm—Henry N. Garrana; John H. Bouchard

[57] ABSTRACT

A transmitter for an induction well logging tool, adapted to be disposed in the borehole of an oil well, develops an output signal for energizing the borehole formation which inherently consists of six separate signal components, the six components including four primary signal components which simultaneously energize the borehole formation inducing in the formation four primary eddy currents. These four primary eddy currents are detected by the array induction tool receiver, the received signals being used to determine the resistivity and conductivity of the borehole formation.

16 Claims, 4 Drawing Sheets

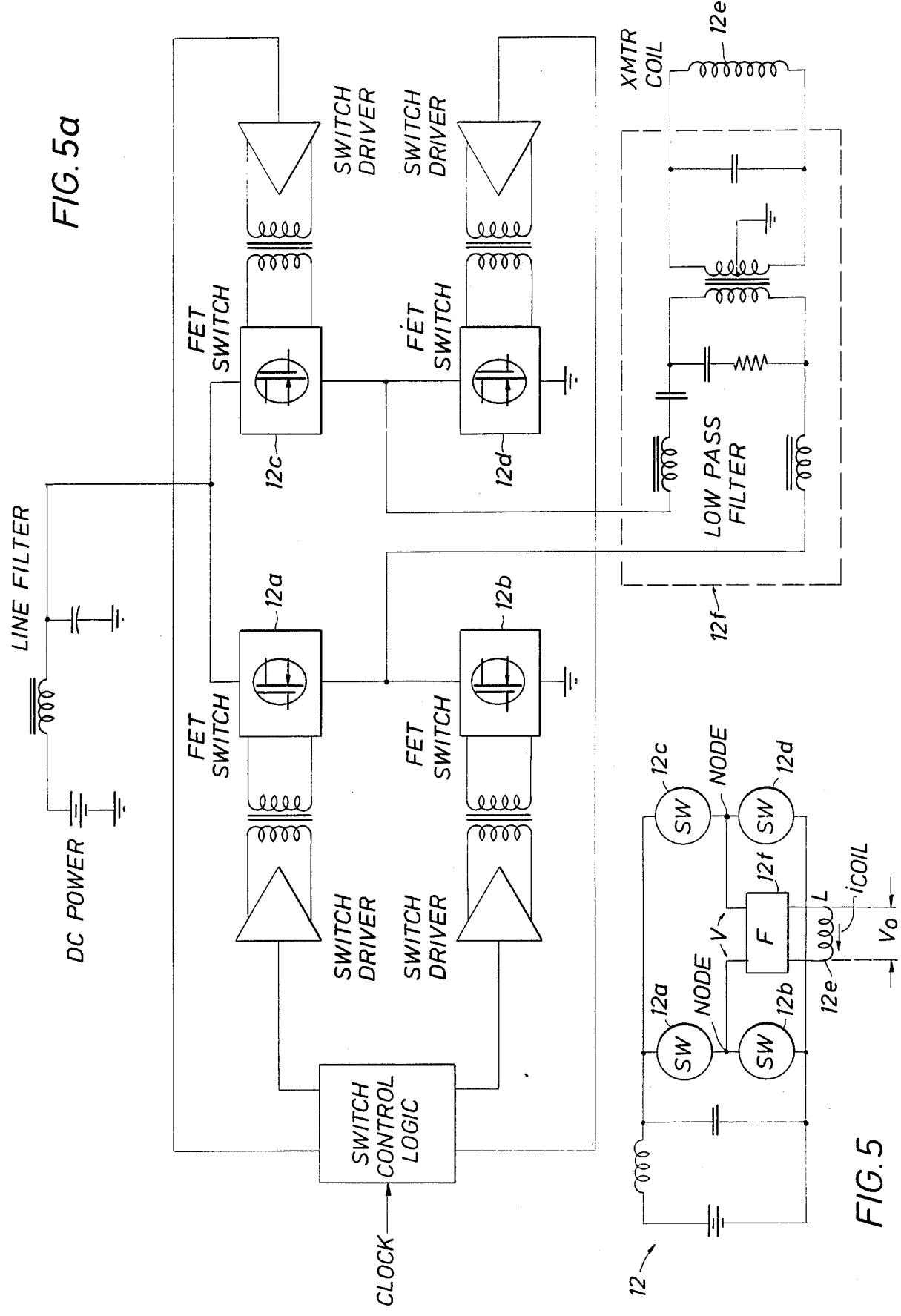

FREQUENCY RESPONSE
OF FILTER F

MULTIFREQUENCY SIGNAL TRANSMITTER WITH ATTENUATION OF SELECTED HARMONIES FOR AN ARRAY INDUCTION WELL LOGGING APPARATUS

BACKGROUND OF THE INVENTION

The invention of the subject application pertains to an induction logging apparatus for oil well boreholes and more particularly to a multifrequency signal transmitter associated with the induction logging apparatus for generating a multifrequency output signal that induces in the formation eddy currents corresponding to each frequency of the multifrequency signal.

An induction logging apparatus disposed in the borehole of an oil well basically comprises at least one transmitter and at least two receiving coils mounted on a support and axially spaced from each other in the direction of the borehole. The transmitting coil is energized by an alternating current at a frequency which is typically 20 KHz and generates an electromagnetic field which induces in the formation surrounding the borehole eddy currents which flow coaxially to the borehole, the intensity of which is proportional to the conductivity of the formation. The field generated in turn by these eddy currents induces in the receiving coil an electromotive force (EMF), which produces a received signal in the receiving coil. By suitably processing the received signal from the receiving coil, a measurement of the conductivity of the formation is obtained.

The transmitter associated with prior art induction tools produced a signal at a single frequency. This single frequency signal induced eddy currents in the surrounding formation corresponding to the single frequency of the transmitted signal. While a corresponding received signal from the receiving coil may be processed, the amount of information corresponding to the conductivity of the formation, derived from the processing of the single frequency signal, is limited. If a multi-frequency signal transmitter is developed, which generates a multi-frequency signal and which induces multiple eddy currents in the surrounding formation, much more information may be derived. The additional information, when used with suitable signal processing techniques, can be used to obtain improved estimates of the earth's conductivity.

SUMMARY OF THE INVENTION

Accordingly, it is a primary object of the present invention to develop a transmitter for an induction well logging tool which transmits a signal into a surrounding formation which inherently includes a multiple number of frequencies.

It is a further object of the present invention to develop the transmitter for the array induction well logging tool which generates an output signal that produces currents in the transmitter coil which are inversely proportional to the square of their respective frequencies.

It is a further object of the present invention to develop a low pass filter for the transmitter associated with the induction well logging tool, the filter substantially suppressing the signals inherent in the transmitter output signal which possess a frequency of greater than or equal to 300 KHz.

Due to limited availability of power in a subsurface sensor, it is a further objective of this invention to generate the required currents while consuming a minimum amount of power.

In accordance with these and other objects of the present invention, a filtered voltage waveform is applied to a transmitter coil which, when subject to a Fourier expansion, inherently includes a multiple number of frequencies. An unfiltered voltage waveform output is input to a low pass filter which attenuates inherent signals having frequencies greater than 300 KHz. When the resultant filtered voltage waveform, from the low pass filter, is analyzed via a Fourier expansion, the following frequency, response characteristics are evident: the amplitudes of the signals at each successive frequency fall of by a factor of 1/f, where f is a frequency corresponding to 1, 2, 4, 5, 7, 8 ($\times$25 KHz), with the exception of f equal 3, 6, 9, 10, 11,...($\times$25 KHz) where the amplitudes are greatly reduced. When the filtered voltage waveform, with frequency components proportional to 1/f, is applied to the transmitter coil, whose impedance varies as f, the resulting frequency components of the current through the transmitter coil exhibits a desired $(1/f)^2$ characteristic. Since multiple frequency signals simultaneouslY energize the formation surrounding the array induction well logging tool, more information (from different depths of investigation) is detected, via the receiving coils of the tool, than was previously the case with respect to the single frequency signal generated from the prior art transmitter.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

FIG. 5 illustrates a low power implementation of the transmitter of FIG. 4 including a low pass filter for filtering out frequencies greater than 300 KHz;

FIG. 5a illustrates a more complete construction of the trasnmitter of FIG. 5;

DETAILED DESCRIPTION OF THE PREFERRED EMBODIMENT

Figure 1:
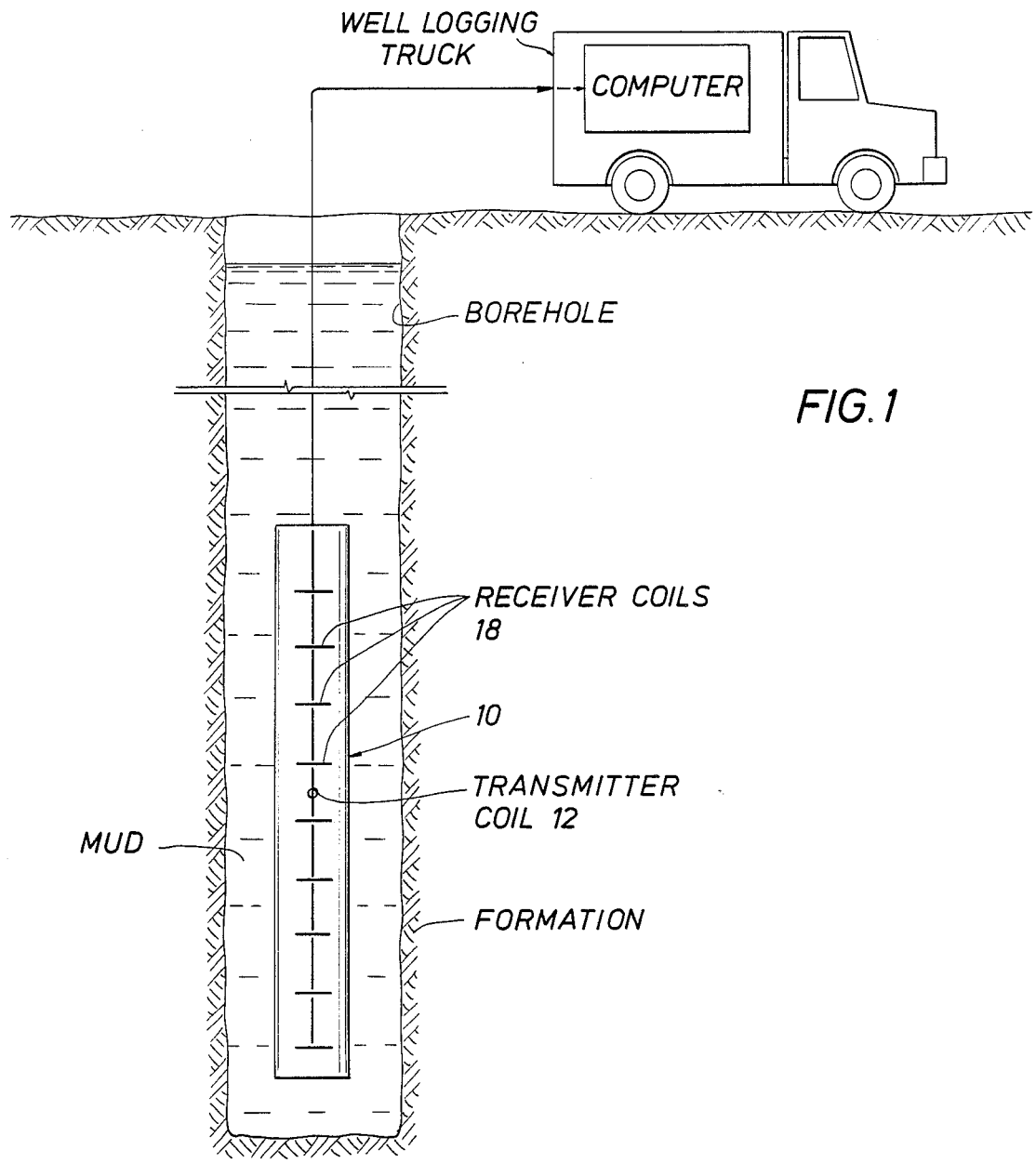
FIG. 1 is an illustration depicting an induction tool in the borehole of an oil well, including a transmitter and a plurality of receiver coils.

Referring to FIG. 1, a borehole of an oil well is illustrated. An induction tool 10 is disposed in the borehole, the tool 10 being connected by a wireline cable to a well-logging truck at the surface of the well. The well-logging truck contains a computer. The well-logging truck computer may comprise any typical computer, such as the computer set forth in U.S. Pat. No. 4,713,751 entitled 'Masking Commands for a Second Processor When a First Processor Requires a Flushing Operation in a Multiprocessor System', the disclosure of which is incorporated by reference into the specification of this application. The tool comprises one transmitter coil 12 and a plurality of receivers 18 (eg., nine in number), each consisting of two coils. The transmitter coil is energized by a known reference current consisting of four or more frequencies, approximately 25, 50, 100, and 200 kHz (kiloHertz). The transmitter coil generates an electromagnetic field in the formation, which produces a coaxial eddy current proportional to the formation conductivity which then induces an electromotive force (EMF) in each of the 9 receivers. Each receiver 18 comprises a main coil and bucking coil connected in series.

Figure 2:
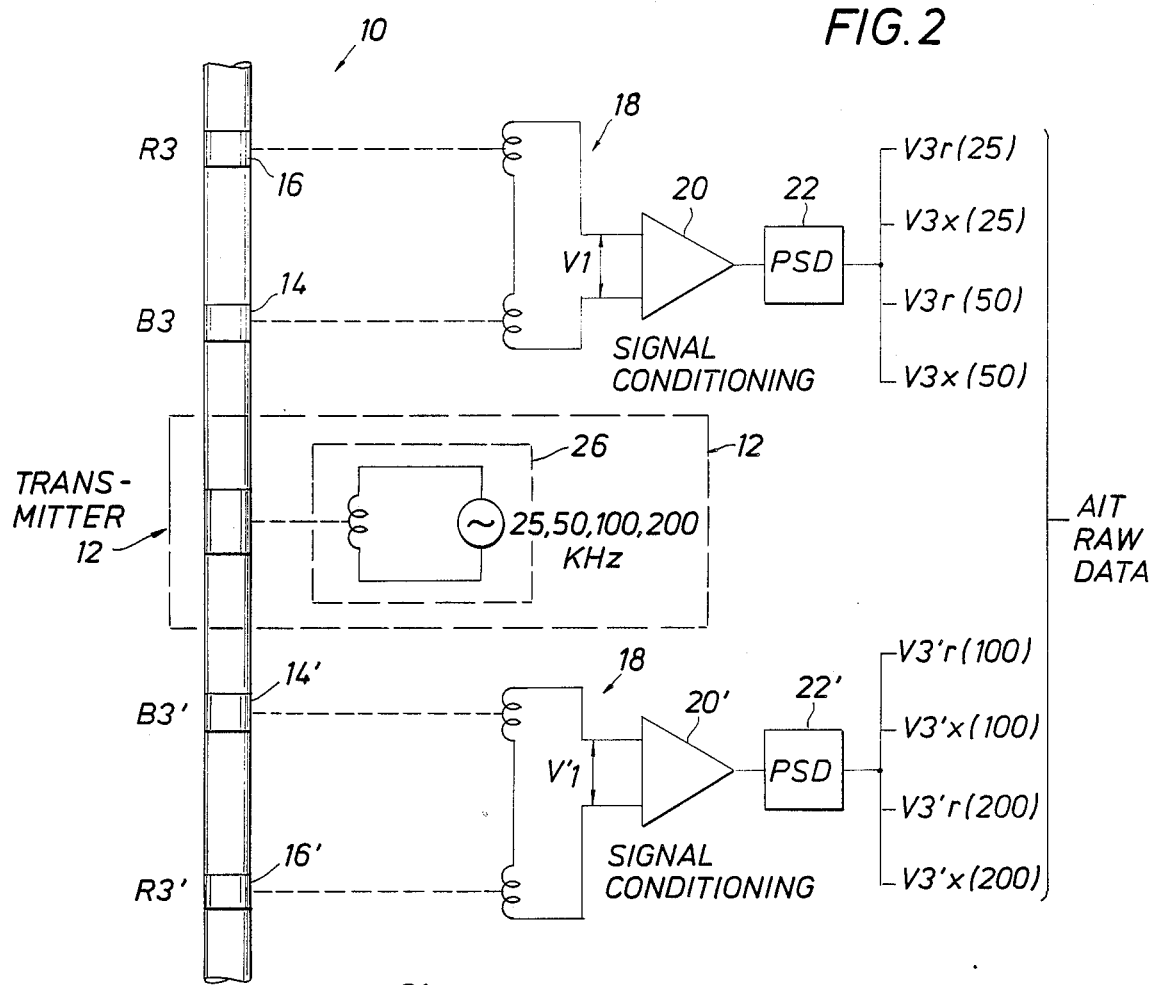
FIG. 2 is another illustration depicting solely the transmitter and the plurality of receiver coils.

Referring to FIG. 2, a more detailed construction of the tool 10, of FIG. 1, is illustrated. The EMF induced in each receiver 18 produces a voltage signal V1, the magnitude of which depends on formation characteristics. The voltage signal V1 is amplified, filtered into two or more separate frequencies, and resolved into in-phase and quadrature components, by the circuitry 20, 22. The voltage is represented in complex (phasor) notation with the in-phase component as the real part of a complex number, and the quadrature (90-degree out-of-phase) component as the imaginary part of the complex number. Two frequencies are selected for each of the nine arrays. Thus for each depth of the tool in the well, eighteen (18) complex voltages are recorded. This data set will be referred to as "raw data". The raw data are transmitted by telemetry to the logging truck computer at the surface for processing.

The tool 10 of FIG. 2 is set forth in detail in prior pending application Ser. No. 043,130, filed Apr. 27, 1987, entitled "Induction Logging Method and Apparatus", the disclosure of which is incorporated by reference into the specification of this application.

In FIG. 2, simple individual arrays are preferred generally consisting of a single transmitter coil 12 and two receiver coils 16, 14 (16', 14'). The basic three-coil induction sensor includes a primary receiver coil 16 located at a distance L from the transmitter. A secondary or bucking coil 14 acts as a mutual inductance balancing coil. The secondary coil is connected in series with the primary coil, but is wound in an opposite sense to the primary coil. The placement of the secondary coil between the transmitter coil 12 and the primary receiver coil 16 is a matter of choice, but once its placement is fixed, the number of its windings may be selected so as substantially to balance or null the direct mutual coupling between the transmitter and the receiver array. If the position of the bucking coil is selected to be 3L/4 or three-fourths of the distance between the transmitter coil 12 and the primary receiver coil 16, the number of turns in the bucking coil should be approximately $(0.75)3 = 0.422$ times the number of turns in the primary coil in order to achieve the balanced condition.

Preferably the tool 10 is constructed of a number of these simple arrays by placing a single transmitter 12 at the center of the tool and placing pairs of receiver coils, such as pairs 16, 14 and 16', 14', on either side of it. Amplifiers 20, 20' and phase-sensitive detectors 22, 22' (PSD) may be constructed of conventional analog induction electronics. As illustrated, a multi-frequency oscillator 26, operating at four frequencies 25, 50, 100 and 200 kHz, excite transmitter 12. The receiver arrays, spaced, for example, three feet from transmitter 12, respond with voltage signals, V1, V1' which depend on formation characteristics. Such voltage signals are amplified, filtered into frequency components at 25, 50, 100, or 200 kHz, and resolved into in-phase and quadrature (90-degree out-of-phase) components.

Figure 3A:
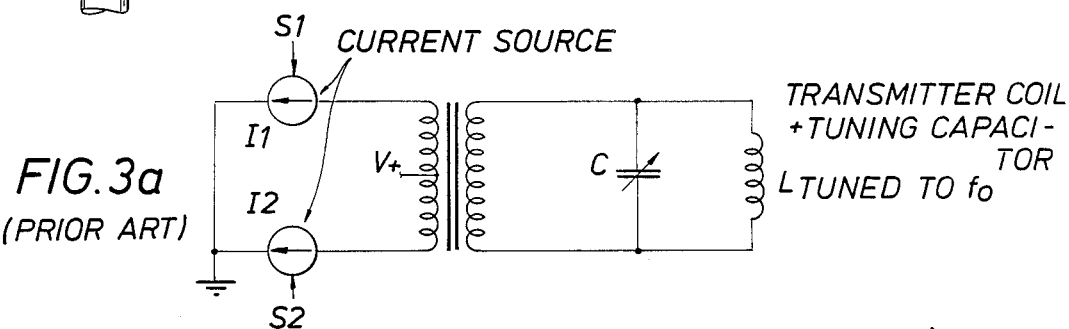
FIGS. 3a–3b are views of a prior art transmitter associated with a prior art array induction tool.
Figure 3B:
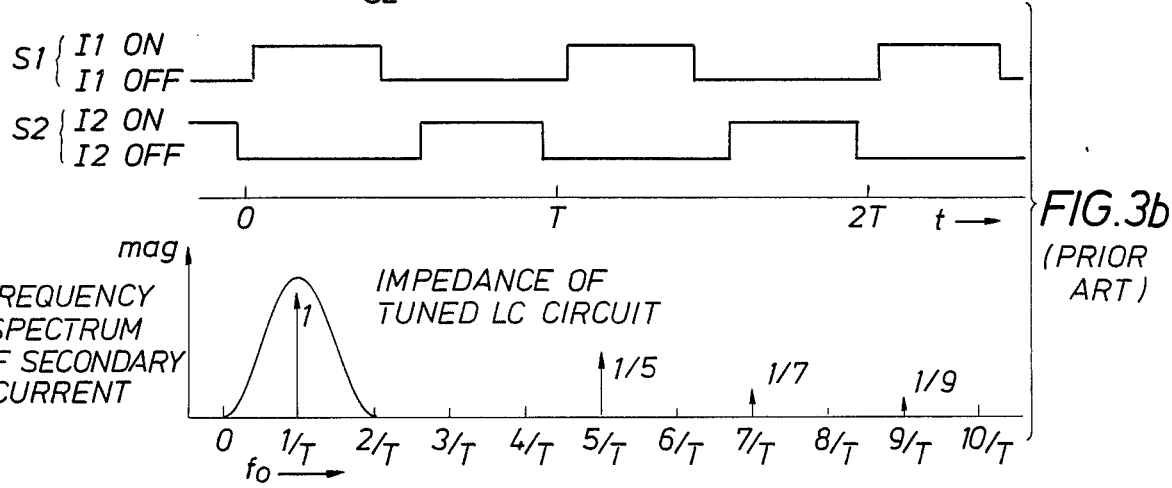

Referring to FIG. 3a, a model of the prior art induction logging tool transmitter is illustrated. In FIG. 3a, a current source I energizes capacitor C and inductor L. Since C and L are connected in parallel, a tuned circuit is formed. Switches "S1" and "S2" open and close in a manner which, in association with the tuned circuit formed by C and L, produce a sinusoidal current in the inductor L, which is also the transmitter coil. Since C and L form a tuned circuit, one output signal iL is produced predominantly at one frequency, the resonant frequency (fo) of the tuned circuit formed by capacitor C and inductor L. Therefore, essentially only one eddy current is induced in the formation of the borehole in response to the single frequency voltage signal V. Less information may be derived from the single frequency eddy current, when a received signal is detected by receiver 18. Referring to FIG. 3b, switching waveforms associated with switches S1 and S2 of FIG. 3a are illustrated. In addition, a frequency spectrum associated with the LC tuned circuit of FIG. 3a is also illustrated.

Figure 4:
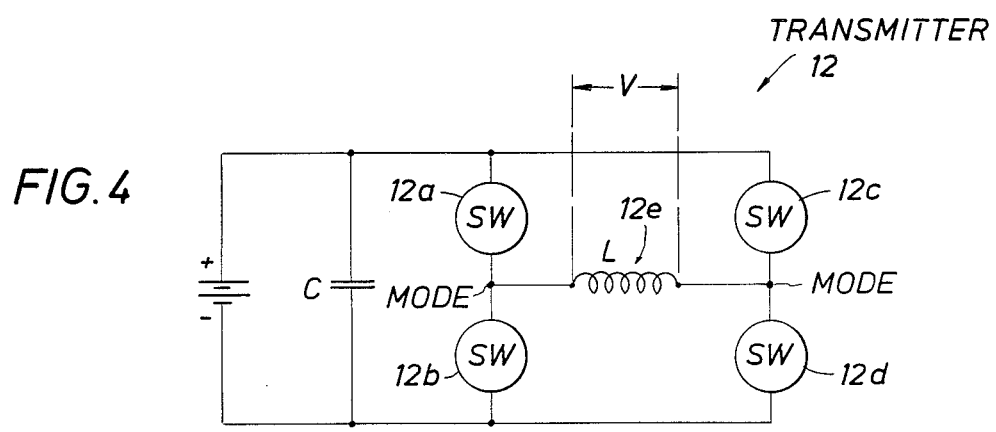
FIG. 4 illustrates a model of the transmitter of the present invention.

Referring to FIG. 4, a low power implementation model of the induction logging tool transmitter of the present invention is illustrated. In FIG. 4, the cpacitor C is no longer positioend in parallel with inductor L. Therefore, the tuned circuit of FIG. 3a has been removed allowing the generation of a multitone excitation in the transmitter inductor L. The desired voltage waveform, V (shown in FIG. 7), is generated under the control of switches 12a–12d. In FIG. 4, switch 12 a is connected in series to switch 12b. Switch 12c is connected in series with switch 12d, but in parallel with switches 12a and 12b. Inductor L 12e is interconnected between the nodes formed by switches 12a/12b and 12c/12d. Voltage source V is connected in parallel with capacitor C. However, a Fourier expansion of the output signal V across the inductor L reveals that components of the signal exist at frequencies greater than or equal to 9×25 KHz. These components are undesirable and should be removed.

Figure 7:
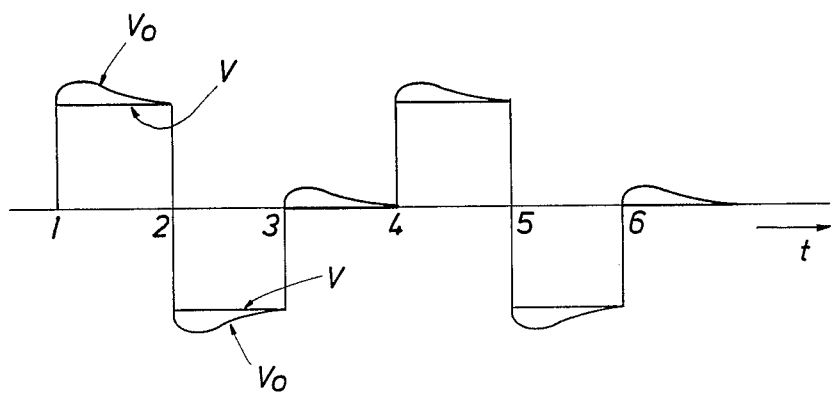
FIG. 7 illustrates a view of the output signal generated by the transmitter of FIG. 5 prior to low pass filtering.

In operation, referring alternately to FIGS. 4 and 7. The voltage between times t=1 and t=2 is generated by closing switches 12a and 12d. This forces a voltage equal to the power supply voltage across the transmitter inductor. The voltage between times t=2 and t=3 is produced by closing switches 12b and 12c. This forces a voltage across the transmitter inductor which is equal in magnitude to the power supply voltage, but which is opposite in polarity. The voltage between times t=3 and t=4 is forced to zero by closing the switches 12b and 12d. A Fourier analysis of the waveform shown in FIG. 7 will reveal that the magnitude of the voltage components produced across the transmitter inductor L are given by:

$$mag\ v(n*f0) = 0.955*V/n,\ n = 1,2,4,5,7,8,10,11,\ldots 0.0,$$
$$n = 3,6,9,12,\ldots$$

where f0=1/(t4 - t1) is the fundamental frequency produced and n represents the respective harmonic number. f0 is typically 20 or 25 KHz. Note that the harmonics which are a multiple of 3 have been suppressed. This is desirable as only the harmonics 1, 2, 4, and 8 are used in the signal processing. The other harmonics, if produced would increase power consumption and decrease signal processing accuracy.

Due to the nature of the coupling of the transmitted current to the received voltage through the conductive earth, it is highly desirable that each of the primary current components (i.e. harmonics 1, 2, 4, and 8) in the transmitter be inversely proportional to the square of the frequency of that respective component. Tailoring the current in this manner ideally results in constant amplitude voltage harmonics in the receiver which in turn assures equal accuracy in signal processing of the individual frequency components. Since the current in an inductor is inversely proportional to the frequency of oscillation of the voltage across the inductor, and the inductor's voltage components are inversely proportional to their respective frequencies, then the current in the transmitter coil will be inversely proportional to the square of the oscillation frequency as desired. The transmitter current magnitude is then:

$$mag\ itrans(n*f0) = v(n*f0)/(2pi*n*f0*L)$$
$$mag\ itrans(n*f0) = 0.955V/(2pi*f0*L*n^2),\ n = 1,2,4,5,7,8,\ldots$$
$$= 0.0\qquad\qquad,\ n = 3,6,9,12,\ldots$$

As power consumption in downhole tools is a major concern, the circuitry has been designed to minimize dissipation. As in the tuned circuit concept of the prior art, the capacitor retains its role as an energy storage element and charge reservoir, and energy is transferred with minimum loss from the capacitor to the inductor and vice versa. This energy cycling action allows the generation of a large inductor current while requiring a minimum of energy from the power supply (represented by the voltage source). The total energy required from the power supply by the circuit in FIG. 4 is primarily that which is dissipated in the equivalent resistance of the transmitter coil. A secondary, but relatively small source of dissipation, is the switching elements themselves. Generation of the transmitter current in this manner requires an order of magnitude less power from the power supply than would be required using linear techniques.

Figure 6A:
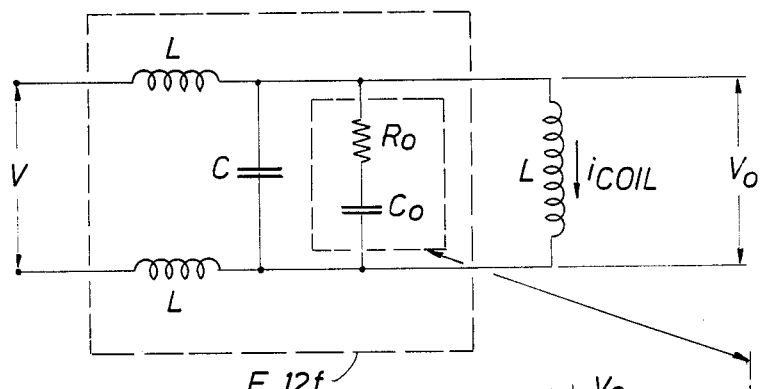
FIG. 6b illustrates a frequency response characteristic of the low pass filter of FIG.

As noted in the Fourier series expansions above, the circuit as indicated in FIG. 4 produces an infinite number of harmonics which decrease as 1/n. We desire to limit the harmonic spectrum generated such that it contains the least amount of extraneous outputs as these higher frequency components can cause degradation of the measurement. A low pass filter (12f) as shown in FIG. 5 is necessary to limit the spectra generated. The preferred implementation is shown in FIG. 6a. As the capacitor C0 becomes very large, a classical 2 pole low pass filter topology is approached. The filter's frequency response characteristics, especially close to the cut off frequency, can be controlled by the damping resistor, R0. The capacitive coupling of R0 differs from the prior art as this element is generally direct coupled. The purpose of C0 is to minimize the power dissipation in the filter by increasing the shunt impedance across L at low frequencies where the voltage magnitude is highest (dissipation is proportional to the square of the voltage across R0). At frequencies close to cut off of the filter, the reactance of C0 decreases to an extent that the resistor R0 effectively dampens the resonance peak of the filter, preventing an unacceptable amplification in the vicinity of cut off. The voltage magnitude in the vicinity of cut off is much less than that at lower frequencies, and dissipation is minimized.

Referring to FIG. 5, the model of the induction logging tool transmitter of FIG. 4, in accordance with the present invention, is shown again, except that a filter F 12f connects the nodes between switches 12a/12b and 12c/12d to the inductor L 12e, the transmitter coil, across which another output signal Vo is measured. The filter F 12f converts the output signal V to the output signal Vo, across the inductor. The output signals V and Vo are illustrated in FIG. 7 of the drawings. FIG. 5a illustrates a more complete construction of the transmitter of FIG. 5.

Figure 6B:
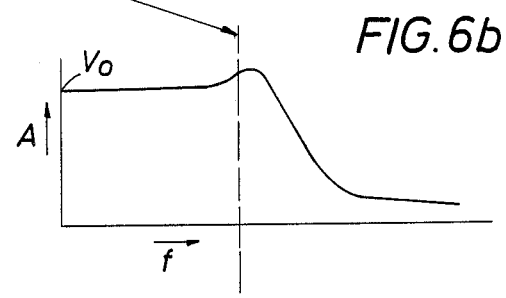

In operation, referring alternately to FIGS. 5, 5a and FIG. 7 of the drawings, during the time period between t=1 and t=2, switches 12a and 12d are closed and switches 12b and 12c are open. Therefore, the pulse of FIG. 7 during t=1 to t=2 appears across the inductor L of FIGS. 5 and 5a. Between t=2 and t=3, switches 12b and 12c are closed and switches 12a and 12d are open. Therefore, the pulse of FIG. 7 during t=2 and t=3 appears across the inductor L of FIGS. 5 and 5a. Between t=3 and t=4, switches 12a and 12c are open and switches 12b and 12d are closed. Therefore, no voltage appears across inductor L of FIG. 5 and 5a. Beginning at t=4, the cycle referenced above repeats itself. Referring to FIG. 6a, a construction of the filter F 12f of FIGS. 5 and 5a is illustrated. The filter F is characterized by the frequency response characteristic of figure 6b. The resistor (Ro) & capacitor (Co) series connection of FIG. 6a is responsible for defining the point along the horizontal axis (frequency) of FIG. 6b where the Amplitude A begins to fall off to zero.

Figure 8:
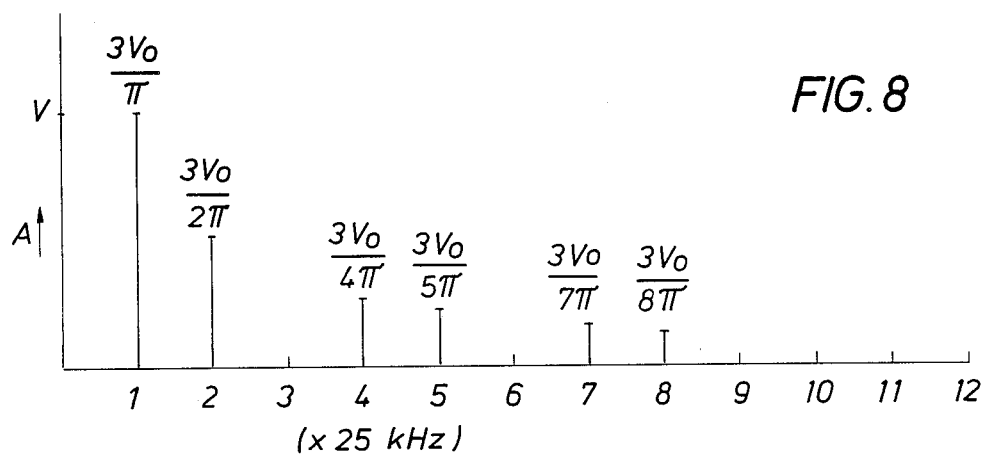
FIG. 8 illustrates the Fourier expansion of the output signal of FIG. 7, the inherent signals including only signals at frequencies corresponding to 1, 2, 4, 5, 7, and 8 times 25 KHz.

Referring to FIGS. 7 and 8, the output signal Vo, output from the inductor L 12e of FIGS. 5 and 5a (along with output signal V before filtering), is illustrated. In FIG. 8, the Fourier expansion of the output signal Vo of FIG. 7 is illustrated. In FIG. 8, four primary frequency components of the output signal Vo energize the formation surrounding the borehole of FIG. 1: the signal appearing at 1×25 KHz, the signal appearing at 2×25 KHz, the signal appearing at 4×25 KHz, and the signal appearing at 8×25 KHz. Signals appearing at frequencies greater than or equal to 9×25 KHz have been substantially reduced (attenuated) by the filter F 12f of FIG. 5. Signals appearing at frequencies 5×25 KHz and 7×25 KHz are present in the overall output signal Vo, and are undesirable components of signal Vo, but their existence in output signal Vo does not detrimentally affect the signal received by receiver coil 18 and the consequent results of the processing of the received signal by the well logging truck computer.

FIG. 8 illustrates an output signal Vo which includes four primary frequency components. All others frequency components (with the exception of two) in the output signal Vo have been substantially reduced or attenuated by filter F 12f. Therefore, four different currents have been generated in the inductor coil 12e of FIG. 5 and, therefore, four different voltages have energized the formation surrounding the borehole of FIG. 1. As a result, four different eddy currents flow in the surrounding formation. The receiver coils 18 detect these four different eddy currents in the formation and transmit corresponding received signals to the well logging truck computer at the surface for processing. The objective of the processing is to determine the resistivity and/or conductivity of the formation surrounding the borehole. Since four different eddy currents have simultaneously been induced in the formation, more information is sensed by the receiver coils 18 in response thereto, and more information is presented to the well logging truck at the surface for determination of the formation resistivity/conductivity. Therefore, a more accurate result of formation resistivity and conductivity is obtained during the processing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In an induction well tool adapted to be disposed in a borehole, a transmitter means connected to a transmitting coil for transmitting a signal into said borehole via said coil, said signal inducing in a surrounding formation of the bore hole a corresponding signal, the transmitter means comprising:

multifrequency signal transmission means connected to said transmitting coil for transmitting into said borehole via said coil a multifrequency output signal, the multifrequency output signal including a plurality of harmonic frequencies which extend between a fundamental frequency and a particular harmonic frequency, the harmonic frequencies above said particular harmonic frequency being substantially attenuated, selected ones of the harmonic frequencies below said particular harmonic frequency being substantially attenuated to reduce power dissipation by said transmission means, a plurality of non-selected ones of the harmonic frequencies below said particular harmonic frequency not being attenuated, said selected ones inducing a second harmonic, said multifrequency output signal inducing in the formation a plurality of signals corresponding in number to the number of frequencies inherent in said multifrequency output signal.

2. The transmitter means of claim 1, wherein the multifrequency signal transmission means comprises:

filter means connected to said transmitting coil for substantially attenuating said harmonic frequencies in said multifrequency output signal above said particular harmonic frequency thereby producing an attenuated multifrequency output signal.

3. The transmitter means of claim 2, wherein the attenuated multifrequency output signal, when subjected to a Fourier analysis, contains said plurality of harmonic frequencies, each harmonic of the plurality having a different frequency from that of any other harmonic of said plurality of harmonic frequencies.

4. The transmitter means of claim 3, wherein the plurality of harmonic frequencies comprise:

a first harmonic frequency and a third harmonic frequency.

5. The transmitter means of claim 4, wherein each of said plurality of harmonic frequencies represent an individual current signal, each said individual current signal having an amplitude expressed by a first relation $I1/n$ where $I1$ is the amplitude of the individual current signal at the fundamental frequency, and n is set forth in a second relation $n \times 25$ KHz, where said second relation represents a set of frequencies and n represents the numbers 1, 2, 3, 4, ...

6. The transmitter means of claim 5 wherein said selected ones of the harmonic frequencies further comprise a fifth harmonic frequency, the amplitudes of said second and fifth harmonic frequencies being approximately zero.

7. The transmitter means of claim 6, wherein said particular harmonic frequency is a seventh harmonic frequency, said filter means substantially attenuating the harmonic frequencies greater than said seventh harmonic frequency.

8. A method, practiced by an induction tool when said tool is disposed in a borehole, of inducing currents in a surrounding formation of said borehole, comprising the steps of:

transmitting a multifrequency signal from a transmitting means of said tool, said signal including a plurality of harmonic frequencies which extend to a particular harmonic frequency, the harmonic frequencies above said particular harmonic frequency being substantially attenuated, selected ones of the plurality of harmonic frequencies below said particular harmonic frequency being substantially attenuated to reduce power dissipation by said transmitting means, a plurality of non-selected ones of the harmonic frequencies below said particular harmonic frequency not being attenuated, said selected ones including a second harmonic frequency;

and radiating said formation with said multifrequency signal, whereby a plurality of eddy currents are induced in the formation, each eddy current corresponding to one of the harmonic frequencies.

9. The method of claim 8, wherein said particular harmonic frequency is a seventh harmonic frequency, and said selected ones of the plurality of harmonic frequencies further include a fifth harmonic frequency, and wherein the method further comprises the steps of:

prior to the transmitting step, attenuating said fifth harmonic frequency in addition to said second harmonic frequency.

10. The method of claim 9, further comprising the step of:

prior to the transmitting step, further attenuating the portion of said multifrequency signal having harmonic frequencies greater than said seventh harmonic frequency.

11. The method of claim 10, wherein a remaining portion of said multifrequency signal is not attenuated during the attenuating step and the further attenuating step, said remaining portion radiating said formation during the radiating step and including a fundamental frequency, a first harmonic frequency, a third harmonic frequency, and said seventh harmonic frequency.

12. The method of claim 11, wherein the harmonic frequencies associated with said remaining portion each have an amplitude expressed by a first relation $I/n$, where $I$ is the amplitude of the fundamental frequency, and n is set forth in a second relation $n \times 25$ KHz, where said second relation represents a set of frequencies and n represents the numbers 1, 2, 3, 4, . . .

13. The transmitter means of claim 1, wherein said multifrequency signal transmission means comprises:
    power supply means for generating a current;
    output means for generating a voltage signal which represents said multifrequency output signal in response to said current;
    first switch means interconnecting one end of said output means to one end of said power supply means for switching between an open and closed circuit position; and
    second switch means interconnecting said one end of said output means to the other end of said power supply means for switching between an open and closed circuit position;
    said output means generating said voltage signal having a first polarity in response to said current flowing in one direction when said first switch means is in said open circuit position and said second switch means is in said closed circuit position,
    said output means generating said voltage signal having a second polarity, where said second polarity is opposite to said first polarity, in response to said current flowing in another direction which is opposite to said one direction when said first switch means is in said closed circuit position and said second switch means is in said open circuit position.

14. the transmitter means of claim 13, further comprising:
    filter means interconnected between said output means and said transmitting coil for attenuating said voltage signal at frequencies greater than said particular harmonic frequency thereby producing an attenuated multifrequency output signal, said attenuated multifrequency output signal being transmitted into said borehole from said multifrequency signal transmission means via said transmitting coil.

15. The transmitter means of claim 14, wherein said attenuated multifrequency output signal, when subjected to a Fourier analysis, contains a plurality of frequencies which include a fundamental frequency, a first harmonic frequency, a third harmonic frequency, and a seventh harmonic frequency, said seventh harmonic frequency being said particular harmonic frequency,
    said filter means substantially attenuating the harmonic frequencies having a frequency greater than said seventh harmonic frequency.

16. The transmitter means of claim 15, wherein said selected ones of the harmonic frequencies below said particular harmonic frequency further include said fifth harmonic frequency, said second harmonic and said fifth harmonic frequencies being substantially attenuated.

* * * * *